Dec. 22, 1942.  E. J. LUETZELSCHWAB  2,305,724
VALVE
Filed Dec. 31, 1940

Inventor:
Edgar J. Luetzelschwab
By Everett A. Johnson
Attorney.

Patented Dec. 22, 1942

2,305,724

UNITED STATES PATENT OFFICE 2,305,724

VALVE

Edgar J. Luetzelschwab, Hammond, Ind., assignor to Standard Oil Company, Chicago, Ill., a corporation of Indiana Application December 31, 1940, Serial No. 372,531

4 Claims. (Cl. 137—139)

This invention relates to apparatus for the regulation of the flow of solids or gases laden with solids. More particularly my invention relates to a valve mechanism for regulating the flow of powdered or granular catalyst.

It is an object of my invention to provide a valve mechanism whereby a more complete closure can be effected. My invention finds great utility in a system for catalytically treating hydrocarbons. Therefore, it is another object to provide a valve mechanism which is capable of positive control and regulation of flow of catalyst into or out of a reaction chamber. A further object of my invention is to provide a catalyst metering device which avoids attrition of the catalyst. Other objects, uses and advantages of my invention will become apparent as the description thereof proceeds.

The above and other objects are attained by my invention wherein the valve plug is actuated by a bellows and has ducts adapted to direct a stream of inert gas upon the valve seat as the valve is closing. The effective seating of the valve also closes the gas ducts and the rapid rise in pressure indicates the effective closure of the valve by the fluid pressure bellows.

Figure 1:
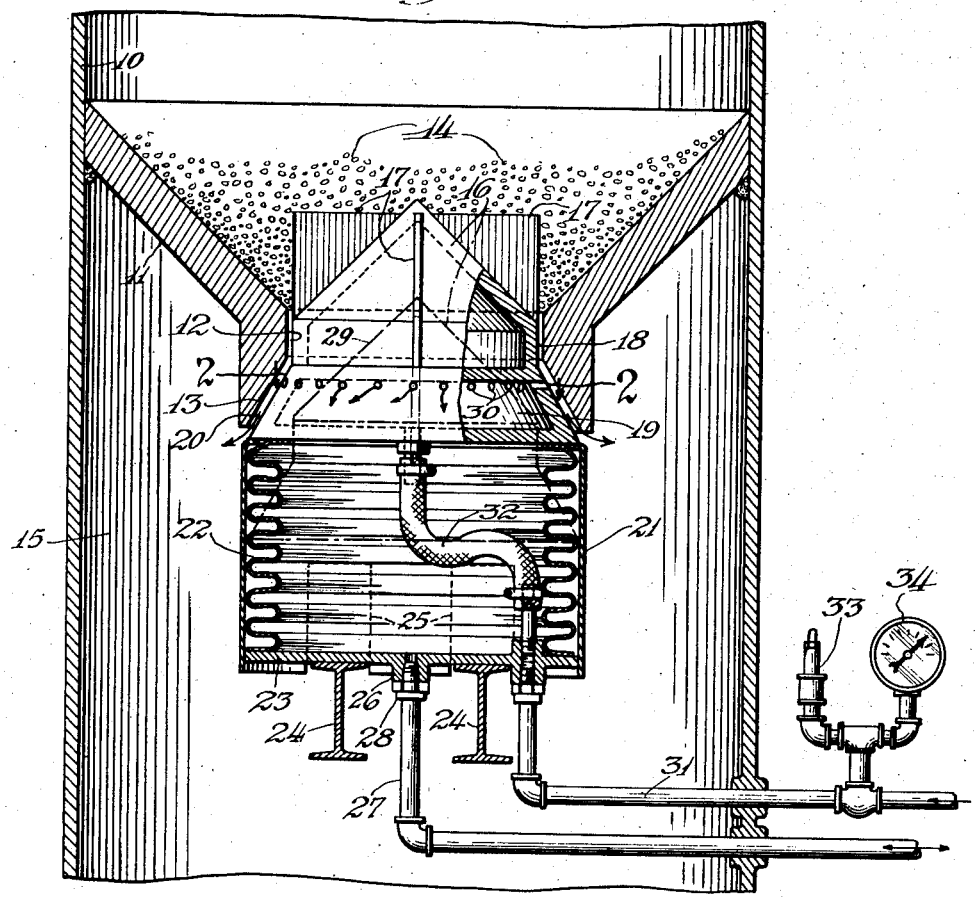
Figure 2:
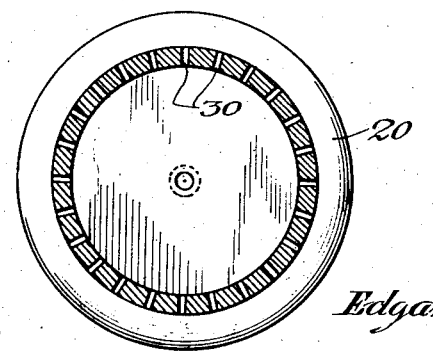

My invention comprises the novel construction of the valve, a preferred form of which will be described hereinafter, reference being made particularly to the accompanying drawing in which:

Figure 1 is a side elevation of an installation embodying my invention, parts being shown in section and parts being broken away; and Figure 2 is a horizontal section taken along the line 2—2 of Figure 1.

The apparatus shown in the drawing comprises a hopper or catalyst tower 10 having a cone bottom 11 which merges into a circular valve guiding portion or sleeve 12 which terminates in valve seat 13. The tower 10 contains a fluid 14 which can be powdered or granular catalyst or otherwise. Chamber 15 can, for example, be a reaction chamber or a secondary catalyst accumulation chamber.

The hollow valve plug or cone 16 slidable longitudinally can be provided with ribs 17 extending from a point near the apex of the cone to the cylindrical base 18 and serve to guide the valve plug within the sleeve 12.

Extending from the cylindrical base 18 is enclosed chamber 19 forming the skirt of the valve with surface 20 being adapted to engage the valve seat 13.

Fixed to the skirt of the valve is a cage 21 enclosing and guiding lapped bellows 22 comprising an annular, corrugated expansible wall. One end of the bellows 22 is fixed to the skirt of the movable valve plug and is within the cage 21. The other end is attached to the base portion 23 which in turn is fixed to supports 24. The cage 21 carried by the valve plug has slots 25 adapted to pass over supports 24 and follows the movement of the bellows 22 while serving to guide the bellows. However, the cage 21 can be replaced by a plurality of guide rails. Likewise the cage or guiding means can be supported by the fixed base 23.

The valve assembly 16—20 is raised and lowered by applying or releasing fluid pressure respectively to bellows 22. A tubular extension 26 of bellows 22 communicates with the base plate 23 and can be screw-threaded to receive the end of a fluid conduit or tube 27 leading to the actuating means. The conduit 27 is fixed to member 23 by means of a union or fitting designated generally at 28.

When the pressure is applied by the actuating fluid entering bellows 22 through line 27, the valve body 20 is raised into an operative position. Likewise withdrawal of the fluid lowers the valve to an open position indicated by broken line 29. Any suitable actuating fluids can be used, for example oil, water, air, steam, flue gas, gaseous hydrocarbons and the like.

Fluid ducts 30 communicate with chamber 19 and the valve seating surface 20 of the valve body or adjacent thereto. Preferably, these conduits comprise a plurality of closely spaced, radially drilled holes. The fluid passes from supply tube 31, through flexible or hinged conduit 32 into chamber 19 and thence onto the valve seat 13, 20. The inert fluid is introduced at a pressure higher than on either side of the valve and is forced through the ducts 30 cleaning the valve seat 13, 20. Thus, the solid particles are removed and the valve closes as tightly as on a dry gas line. The fluid preferably is inert to the catalyst and reactants and can be for example air, steam, flue gas, nitrogen, gaseous hydrocarbons, etc. Likewise although it is preferred that the fluid ducts 30 lead to the valve seat, the ducts can communicate with the adjacent area either above or below the valve seat proper. For example the ducts can extend through 18 and onto annular valve guide 12.

Relief valve 33 and/or indicating pressure gauge 34 are provided on line 31 leading from the inert fluid source to the chamber 19. When the valve seat 13, 20 is gas-tight, it is apparent that the cleaning fluid no longer will flow from chamber 19, and the pressure will rise rapidly. This increase in pressure can be used to indicate that the valve is in fact completely closed. Relief valve 33 can be provided or some other pressure responsive mechanism can be used to control the flow of gas. Likewise, this auxiliary fluid system can be used to detect leaks in the valve during operation.

The invention has been disclosed in a single embodiment but it is understood that it may take various forms and find numerous applications and that I do not intend to be limited except by the appended claims.

I claim:

1. A valve for regulating the gravity flow of solid particles comprising a port having a valve-seating surface, a chambered valve plug adapted to close said port, a fluid-actuated bellows carrying said valve plug, an actuating-fluid conduit communicating with the interior of said bellows, a flexible gas-supply line passing through said bellows and communicating with the interior of said chambered valve plug, a plurality of gas ducts leading from the interior of said chambered valve plug to the plug surface whereby the body of flowing solid particles is aerated and the valve seat is freed of solid particles before the valve plug seats, the said ducts being adapted to be cut off by the closing of the valve.

2. A valve mechanism for regulating the flow of solid particles comprising a discharge port having a valve-seating surface, a chambered valve plug adapted to engage said valve-seating surface to close effectively said port, a fluid-holding bellows for actuating said valve, one end member of said bellows being fixedly mounted, the other end of said bellows comprising said valve plug and being movable relative to the fixed end, an actuating-fluid conduit communicating with said bellows, a gas-supply line passing through said bellows and communicating with the interior of said chambered valve plug, a plurality of ducts leading from the chamber in said valve plug to the valve-seating surface, said ducts being adapted to be blocked when the discharge port is effectively closed, and means for determining the closed position of said valve comprising a pressure-responsive device on said gas-supply line.

3. In a device for transferring powdered catalyst from a catalyst accumulation zone into a contacting zone, the improvement comprising a discharge port leading from said catalyst accumulation zone to said contacting zone, a chambered valve plug adapted effectively to close said discharge port, a bellows for moving said valve plug into said closed position, one end of said bellows being fixedly mounted and the other end being fixed to said chambered valve plug, an operating-fluid conduit communicating with the interior of said bellows, a cage extending from said valve plug and surrounding said bellows, a gas-supply line passing through said bellows and communicating with the interior of said chambered valve plug, a plurality of ducts leading from the chamber in said valve plug to the valve-seating surface adapted to direct a stream of gas between the valve plug and valve-seating surface, whereby the body of flowing solid particles is aerated and the valve-seating surface is freed of solid particles before the valve closing, and means for determining the closed position of said valve comprising a pressure-responsive device on said gas-supply line.

4. In the combination of a reservoir for a body of solid particles and means for regulating the gravity flow of solid particles therefrom the improvement comprising a port having a valve seating surface, a chambered valve plug adapted to close said port, an aeration gas supply line communicating with the interior of said chambered valve plug, a plurality of aeration gas ducts leading from the interior of said chambered valve plug to the plug surface normally adapted for flow of aeration gas therethrough whereby the valve seating surface is freed of solid particles when the valve plug seats and aeration gas is introduced into the body of solid particles, the said ducts being adapted to be blocked by the closing of the valve, and means for determining the open and closed positions of the valve plug, said means comprising a pressure-responsive device on said aeration gas supply line.

EDGAR J. LUETZELSCHWAB.